J. McLEOD.
TREAD BAND FOR PNEUMATIC TIRE WHEELS.
APPLICATION FILED MAR. 15, 1911.
1,053,847.
Patented Feb. 18, 1913.
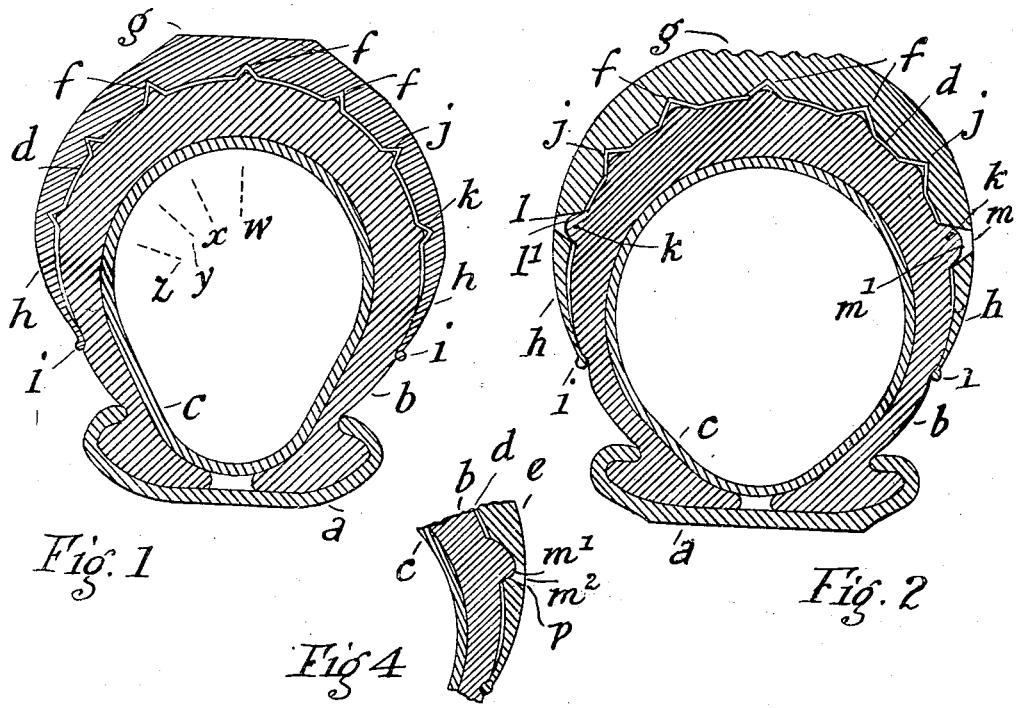
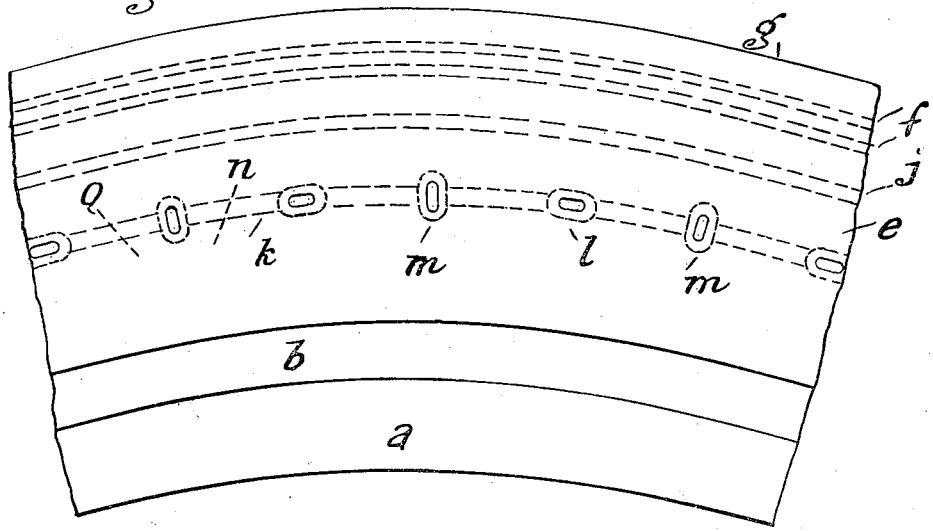
WITNESSES
M. E. Gray
F. M. Meyer
INVENTOR
J. McLeod

UNITED STATES PATENT OFFICE.

JAMES McLEOD, OF ST. KILDA, VICTORIA, AUSTRALIA.

TREAD-BAND FOR PNEUMATIC-TIRE WHEELS.

1,053,847. Specification of Letters Patent. Patented Feb. 18, 1913.

Application filed March 15, 1911. Serial No. 614,602.

*To all whom it may concern:*

Be it known that I, JAMES McLEOD, a subject of the King of Great Britain and Ireland, &c., residing at St. Kilda, in the State of Victoria, Commonwealth of Australia, have invented certain new and useful Improvements in Tread-Bands for Pneumatic-Tire Wheels; and I do hereby declare the following to be a full, clear, and exact description of the invention, such as will enable others skilled in the art to which it appertains to make and use the same.

This invention relates to a tread band or shoe for the cover of a pneumatic-tire wheel. Tread bands have been hitherto proposed, but with constructions differing from mine. My band is held in working position by inflation of the inner tube, which expands the cover within the band. The latter is exteriorly of steel or the like and interiorly of asbestos. The exterior is smooth or of any preferred contour. The interior contains a series of wide continuous V shaped grooves pointing in different directions. The sides of the band are in the preferred forms of my invention provided with a series of slots or elongated apertures not all extending in the same direction. The internal grooves form circles of different diameters, and especially in conjunction with the slots afford a powerful grip on the cover, preventing the tread band becoming displaced laterally or longitudinally. The asbestos portion of the tread resists the passage of outer heat to the cover. Where the apertures or slots aforesaid are tapering (being smaller at their outer ends) each aperture becomes plugged by the cover, which is forced into these perforations by the pressure of the inner tube.

The sides of the tread band are of much thinner metal than the middle part; these sides are resilient, and somewhat expansible under the pressure of the cover. The edges of the tread are shouldered or rounded forming a lip which becomes sunk in the cover when the latter is expanded. This increases the stability of the tread during use.

In the accompanying drawings Figure 1 exhibits a cross sectional view of a pneumatic tire having my construction. My preferred form is shown in Fig. 2 in cross section, and Fig. 3 in side elevation. Fig. 4 shows a detail modified.

In these views, lettered parts are:—$a$—$a$ wheel rim, metal or otherwise, of any suitable form. $b$—any suitable pneumatic tire cover, inclosing an inner tube. $c$—an inner tube or means by which pressure within the cover is maintained. $d$—an asbestos lining of the tread band. $e$—a tread band of steel or the like. $f$—a series of circular internal grooves (of V shape in cross section) at and near the middle of band $e$. $g$—the middle part of band $e$, smooth in Fig. 1, but ribbed in Fig. 2. $h$—tapering, thin, resilient sides of band $e$. $i$—a flange or lip around each edge of sides $h$. $j$—circular internal grooves of V shape in cross section, located between grooves $f$, and grooves $k$ undermentioned. $k$—circular internal grooves of V shape in cross section, located at the side of band $e$.

The internal grooves are simple in form, and admit readily of cover expansion into them; they also provide considerable surface against which the cover will be firmly pressed. These grooves are wide angled; and, having no sharp edges, are free from tendency to cut the cover. Moreover they point in different directions as will be observed from lines $w$, $x$, $y$, $z$, which if produced upwardly in Fig. 1 would bisect the grooves. These features contribute to the firm retention of the tread band in place during traveling.

$l$ and $m$ are holes through the tread band sides at intervals along groove $k$, the holes tapering so as to be small externally. I ordinarily use holes with lengths as $l$ longitudinal, and others as $m$ transverse to groove $k$. These holes increase the surface allowance for cover expansion. The cover bulges into the tapering holes as at $m^1$, $l^1$. The holes are located far down the tread sides so as not to allow the entrance from without of anything that could puncture the tire.

The directions and shapes of the holes in the sides of the tread band may be varied from what is illustrated; thus they are set diagonally in some cases with their lengths on lines as $n$, $o$; or they may be all set longitudinally as at $l$; or as in Fig. 4 the holes $m^2$ point away from the tread middle, so that there will be still less opportunity for puncture, and so that if anything enters the hole and strikes the bevel $p$, the latter will tend not to guide it farther in, but to allow it to escape again.

The asbestos lining may consist of any suitable mixture of asbestos with adhesive material, applied in such manner as to suitably coat the tread band.

What I claim Letters Patent for is:—

1. In a tire the combination of an inner tube, an outer case inclosing said inner tube, a metal protector inclosing the major portion of the outer case and formed with a series of grooves, said protector having outwardly tapered openings below the tread surface of the protector to form pockets, said pockets and said grooves receiving the expanded portion of the case when the tire is inflated.

2. In a tire the combination of an inner tube, an outer case inclosing said inner tube, a metal protector inclosing the major portion of the outer case and formed with a series of grooves, said protector having a plurality of elongated outwardly tapered openings below the tread surface of the protector to form pockets, certain of the elongated tapered openings being disposed at an angle to the remaining elongated tapered openings said elongated pockets and said grooves receiving the expanded portion of the case when the tire is inflated.

In witness whereof I have hereunto set my hand in the presence of two witnesses.

JAMES McLEOD.

Witnesses:
GEORGE A. FERRI,
BEATRICE M. LOWE.